(12) United States Patent
Nielsen

(10) Patent No.: US 9,370,756 B2
(45) Date of Patent: Jun. 21, 2016

(54) AGGLOMERATION APPARATUS AND METHOD FOR PRODUCING AGGLOMERATED PARTICLES

(71) Applicant: NIRO A/S, Soborg (DK)

(72) Inventor: Peter Schultz Nielsen, Soborg (DK)

(73) Assignee: NIRO A/S, Soborg (DK)

( * ) Notice: Subject to any disclaimer, the term of this patent is extended or adjusted under 35 U.S.C. 154(b) by 0 days.

(21) Appl. No.: 14/714,998

(22) Filed: May 18, 2015

(65) Prior Publication Data

US 2015/0246333 A1      Sep. 3, 2015

Related U.S. Application Data

(62) Division of application No. 12/298,662, filed as application No. PCT/DK2006/000238 on May 2, 2006, now abandoned.

(51) Int. Cl.
| | |
|---|---|
| *F26B 3/08* | (2006.01) |
| *B01J 2/16* | (2006.01) |
| *B29B 9/08* | (2006.01) |
| *B29L 31/00* | (2006.01) |

(52) U.S. Cl.
CPC ... *B01J 2/16* (2013.01); *B29B 9/08* (2013.01); *F26B 3/08* (2013.01); *B29L 2031/772* (2013.01)

(58) Field of Classification Search
CPC .......... F26B 3/08; B01J 2/16; B01J 8/24; B01J 8/245; B29B 9/08; B29L 2031/772
See application file for complete search history.

(56) References Cited

U.S. PATENT DOCUMENTS

| | | | |
|---|---|---|---|
| 4,780,966 A | 11/1988 | Harding | |
| 5,044,093 A | 9/1991 | Itoh et al. | |
| 5,357,688 A | 10/1994 | Christensen | |
| 5,427,795 A | 6/1995 | Feyen et al. | |
| 5,480,617 A | 1/1996 | Uhlemann et al. | |
| 5,615,493 A | 4/1997 | Funder | |
| 5,648,118 A | 7/1997 | Liborius | |
| 5,695,701 A * | 12/1997 | Funder et al. | 264/117 |
| 5,782,011 A | 7/1998 | Boersen et al. | |
| 5,839,207 A | 11/1998 | Christensen et al. | |
| 6,332,902 B1 | 12/2001 | Simonsen et al. | |
| 6,532,905 B2 | 3/2003 | Belin et al. | |
| 6,711,831 B1 | 3/2004 | Hansen et al. | |

FOREIGN PATENT DOCUMENTS

| | | |
|---|---|---|
| DE | 43 044 05 A1 | 8/1994 |
| EP | 0 711 593 A1 | 5/1996 |
| EP | 1 227 732 | 7/2003 |
| WO | 00/74837 A1 | 12/2000 |

* cited by examiner

*Primary Examiner* — Jiping Lu
(74) *Attorney, Agent, or Firm* — Sughrue Mion, PLLC

(57) ABSTRACT

A method for producing agglomerated particles, including maintaining in a fluid bed a fluidised particle layer above a plate having perforations through which fluidisation gas flows, the fluid bed being divided into an inner and an outer zone, supplying the fluidised particle layer with descending particles directly from a spray dryer to be agglomerated in the fluid bed, atomizing an agglomeration liquid in the fluidised layer of particles, and guiding the fluidised particles in a plug-flow toward an outlet. The outer zone receives the majority of the descending particles and the inner zone is connected to an outlet.

1 Claim, 4 Drawing Sheets

AGGLOMERATION APPARATUS AND METHOD FOR PRODUCING AGGLOMERATED PARTICLES

CROSS-REFERENCE TO RELATED APPLICATIONS

This application is a divisional of U.S. application Ser. No. 12/298,662 filed on Oct. 27, 2008, which is U.S. National Stage of International Application PCT/DK2006/000238 filed on May 2, 2006, the disclosures of which are incorporated herein by reference in their entirety.

INTRODUCTION

The present invention relates to an agglomeration apparatus and a method for producing agglomerated particles. The present invention is useful for increasing the particle size and for removing or reducing the amount of dust in the final product. In certain embodiments, a narrow particle size distribution of the agglomerated particles may be obtained.

BACKGROUND ART

It is convenient to provide a variety of solids in a particulate state. However, when the particle size is small, dust problems may arise. One way of avoiding dust problems is to agglomerate the small particles into a larger agglomerated product. In addition, agglomeration of particles may confer new or changed properties, such as increased solubility or wettability.

EP 1 227 732 B1 (Niro) suggests agglomerating particles in a spray dryer having an integrated fluid bed in the bottom and a flexible filter element in the top of the drying chamber. Optimal agglomeration is obtained along the inner surface of a part of the conical bottom section of the spray drying chamber, thereby substantially reducing the amount of fine particles.

U.S. Pat. No. 5,695,701 (Niro) discloses an apparatus for the preparation of an agglomerated material from a liquid. The apparatus has a trough-shaped fluidizing path in the bottom and a nozzle for spraying an atomized liquid on the fluidized powder. Perforations in a perforated plate are arranged such that the fluidizing gas is directed i.a. in a direction perpendicular to the longitudinal direction of the trough-shaped path. Above the perforated plate, a row of filters may be arranged through which filters the leaving gas flow passes in such a way that the fine particles entrained therewith are separated and fall back into the fluidized layer.

U.S. Pat. No. 5,044,093 discloses a spray drying granulation apparatus having a fluid bed in the bottom of the spray drying chamber. In the perforated plate of the fluid bed part of the apparatus, a binder supply nozzle may be provided. The nozzle ejects atomized binder liquid vertically upwards and the droplets collide with the particles in the fluid bed. The binder supply nozzle is spraying into a so-called Wurster tube, separating the spraying zone from the remainder of the fluid bed. The growing particles are circulated in the fluid bed between the zones on each side of the Wurster tube wall until a sufficient size has been obtained.

U.S. Pat. No. 5,615,493 (Niro) describes a spray drying device comprising a fluid bed at the bottom of the drying chamber. The fluid bed is divided into a central back-mix section and a surrounding annular plug-flow section shielded from descending spray-dried particles. In the plug-flow section, nozzles may be arranged for spraying a suitable liquid on the particles in view of obtaining a further agglomeration thereof. The plug-flow along the inner circumference of the fluid bed is attained due to the constant feeding of the annular section with particles from the central section and the corresponding withdrawal of dried agglomerated particles through e.g. an overflow slot.

In the prior art discussed above an agglomeration may be obtained of the particles. However, the treatment of the particles in the prior art apparatuses and the atomizing of agglomeration fluid are not sufficiently well-defined for a uniform agglomeration to take place. The object of the present invention is to provide an apparatus which may perform a more uniform and controlled agglomeration process. Especially, it is desired to avoid or reduce the amount of fine particles in the final product to eliminate dust problems during handling of the agglomerates.

The present invention provides an agglomeration apparatus comprising a fluid bed having a perforated plate and means for producing an upwardly directed fluidisation gas flow through the perforations of the plate for maintaining a fluidised particle layer above the plate, a source of descending particles to be agglomerated in the fluid bed, a nozzle for atomizing an agglomeration fluid, said nozzle being positioned below the surface of the fluidised particle layer and pointing in an upward direction, and an outlet for discharging the agglomerated particles, wherein the fluid bed is provided with an outer zone receiving the majority of descending particles and an inner zone connected to the outlet.

The descending particles are primarily received by an outer zone and guided towards the outlet in an inner zone. It may be ensured by a variety of ways that a majority of the descending particles are received by the outer zone. In one embodiment, the outer zone is allocated an active fluidisation area of the fluid bed greater than 50%, preferably greater than 70%. In another embodiment, a conical wall is provided above the fluid bed. The conical wall concentrates the descending particles and the particles are delivered at the inner perimeter of the fluid bed. The descending particles are subsequently agglomerated in a controlled fashion in the outer zone. The outer zone is preferably at least in a part of the flow path delimited by the wall of the fluid bed. In the outer zone a plug-flow is suitably maintained to obtain a uniform treatment of the descending particles.

The means establishing different fluidisation gas flow velocities in the zones are generally adjusted such that the zone closest to the outlet is provided with a higher fluidisation gas velocity compared to the preceding zone. The higher fluidisation gas flow velocity in the inner zone ensures that the growing particles are maintained in a fluidised state and that minor particles are blown away. The presence of an atomizing nozzle capable of atomizing an agglomeration fluid in the uniformly conveyed, fluidised layer provides for an equal wetting of the fluidised particles and, in consequence, an optimal agglomeration. The outer zone may be provided with two or more sections in which the fluidisation gas flow velocity is altered.

The sections with different fluidisation gas velocities may be provided in the bottom of the fluid bed by a variety of methods. In a certain embodiment, the plenum below the perforated plate is designed to direct more fluidisation gas to a certain section. In another embodiment, the perforations of the perforated plate are larger in the section having the highest gas flow velocity and, conversely, smaller in a section having a lower gas flow velocity. In a still further embodiment, the different zones are supplied with fluidisation gas from separate plenums.

In an aspect of the invention, the fluid bed comprises at least one partition wall provided in the fluidised particle layer. The at least one partition wall generally separates the inner and the outer zones. The partition wall may be arranged in the entire vertical extent of the fluidised layer or only in a part thereof. In a preferred aspect, the partition wall abuts the perforated plate of the fluid bed and extends essentially vertically upwards.

The partition wall may be provided to define a flow path of the particles. The shape of the partition wall depends, among other things, on the inner form of the fluid bed. In a preferred aspect of the invention the flow path of the fluidised particles in the outer zone follows the inner circumference of the fluid bed wall. In the event that the inner walls of the fluid bed are essentially a vertical cylinder, the partition wall may be a cylinder part placed co-axially in the fluid bed. Thus, in a preferred embodiment, an at least partly cylindrical partition wall is provided coaxially in the fluid bed, thereby defining a plug-flow path for the fluidised particles between the interior circumference of the fluid bed and the partition wall.

The defined flow path of the agglomerated particles ends in an outlet, which is connected to the inner zone. Suitably, the outlet is arranged via the bottom of the fluid bed. The outlet is generally provided with means for controlled particle removal, such as an overflow slot. In a certain aspect of the invention, the outlet for the agglomerated particles is positioned substantially in the centre of the fluid bed. The position of the outlet in the fluid bed centre allows for an easy adaption of the invention to existing spray dryers. Furthermore, the flow path of the particles starting at the circumference and ending in the centre of the fluid bed uses the drying capacity in an optimal way.

The source of descending particles is not limited to particles prepared by a particular technology. The descending particles may be substantially dry or partly dried. In a preferred aspect of the invention, the descending particles contain an amount of moisture, which allows them to agglomerate to some degree before reaching the fluidised layer. In a preferred aspect of the invention, the source of descending particles is selected from the group comprising a spray dryer, a filter unit, and a cyclone. In case of using a cyclone, shielding means to separate the cyclone and the fluid bed are provided. Generally, a spray dryer is preferred as the source of descending particles. In the lower part of the drying chamber, the walls are generally conical and meet the cylindrical walls of the fluid bed. Thus, in a preferred aspect of the invention, the fluid bed is provided in the lower part of a spray drying chamber, said fluid bed receiving the descending, partly dried, particles from the spray dryer. The particles are believed to slide down the conical walls of the drying chamber, thereby being concentrated in the outer zone.

In a certain aspect of the invention a spray dryer and a filter unit is combined, such that the spray drying chamber comprises internally arranged filters. Preferably, the filters are flexible filter bags mounted in the ceiling of the spray drying chamber and operated intermediately by a counter blow to release particles from the filter. The particles descend from the filters and are mixed with the partly dried particles from the spray dryer in an agglomeration area of the drying chamber. The partly dried and partly agglomerated particles continue to descend into the fluid bed.

In a flow path of the fluidised particles, one or more nozzles for atomizing an agglomeration fluid are provided, said nozzles being positioned below the surface of the fluidised particle layer and pointing in an upward direction. Nozzles pointing upward include nozzles pointing in an essentially vertical direction as well as nozzles pointing until 90 degrees off-axis relative to the vertical direction. If only a single nozzle is used, it is generally placed in the outer zone. The inner zone then serves to dry the agglomerated particles. If desired, more than a single nozzle may be provided in the outer zone.

To obtain larger agglomerates, generally two or more agglomeration nozzles are arranged along the plug-flow path of the fluidised particles. The nozzles may be evenly distributed throughout the flow path, i.e. provided in each zone or may be concentrated in some sections. In the event that a concentration of nozzles appears, it is generally preferred to concentrate the nozzles in the first part of the outer zone and/or mid part of the flow path.

The nozzle may be adjustable in height. In some applications of the present apparatus, the nozzles are in the same level as the perforated plate. However, it may be appropriate to place the nozzle either below or above the level of the perforated plate. In the event that more than a single nozzle is provided, the nozzles may be provided in different heights.

According to a certain embodiment of the invention, the agglomeration nozzle may further be provided with a tube arranged coaxially around the nozzle for supplying a secondary fluidization gas around the atomized fluid. At the tip of the nozzle, the secondary gas may be liberated through an orifice to secure the proper velocity to enhance the interaction between the particles in the fluidised layer and the atomized agglomeration liquid. It may be an advantage in the supply line for the secondary fluidisation gas to provide swirling means to increase the efficiency. To prepare a versatile apparatus suitable for different products to be agglomerated, the agglomeration nozzle and/or the tube arranged co-axially around the agglomeration nozzle may be adjustable in height.

The invention also provides a method for producing agglomerated particles, the method comprising the steps of:

maintaining in a fluid bed a fluidised particle layer above a plate having perforations through which fluidisation gas flows, said fluid bed being divided into an inner and an outer zone.

supplying the fluidised particle layer with descending particles to be agglomerated in the fluid bed, atomizing an agglomeration liquid in the fluidised layer of particles, guiding the fluidised particles in a plug-flow toward an outlet, wherein the outer zone receives the majority of the descending particles and the inner zone is connected to an outlet.

The controlled plug-flow is an advantage. The uniform treatment of the particles has surprisingly resulted in an improved bulk density of the final product. Based on experiments with prior art technology in the field, it was expected that the density of the product would decrease considerably during the agglomeration process. However, in a specific sample, the bulk density was maintained at the same value. In a preferred aspect of the invention, the fluidisation gas flow velocity of the inner zone connected to the outlet is higher than the fluidisation gas flow velocity in the outer zone. The increased fluidisation gas flow velocities along the path of the fluidised particles accounts for an increased probability of the fine particles to agglomerate. The result is a final product containing only a minor or negligible fraction of small particles.

In general it is preferred in the outer zone to let the fluidised particles be conveyed along the circumference of the fluid bed walls. To obtain a higher degree of agglomeration, the sections provided with different fluidisation gas flow velocities are provided with at least one atomisation nozzle in each section. In the event that the nozzle for ejecting the agglomeration fluid is a two-fluid nozzle, the nozzle is provided with a supply of nozzle gas. Further, a secondary fluidization gas may preferably be added around the nozzle to increase the velocity around the same with the purpose of improving the interaction between the particles and the agglomeration fluid. The high velocity creates a local under-pressure securing a sufficient particle movement. Such secondary gas typically has a velocity of 5 to 50 m/s. The supply line for secondary fluidization gas may include means, e.g. such as vanes, for creating a swirl on the gas flow to increase the effect.

The difference in fluidisation gas flow velocities in the various zones or sections may be regulated to obtain the desired flow properties. In a certain embodiment, the passage from one zone or section to another is continued without any sharp borderline. However, generally it is desired to control the flow by stepwise increasing the gas flow velocity along the path of the fluidised particles. In a certain aspect of the invention, the fluidisation gas velocity in the inner zone proximal to the outlet is at least 5% higher than the adjacent zone or section in the fluid bed. The gas flow velocity is generally in the range 0.3 to 3.0 m/s, preferably 0.5 to 1.5 m/s, and a preceding zone or section may have gas flow velocity which is about 5% to about 40% lower. In a specific example, the gas flow velocity in the zone closest to the outlet is about 1.0 m/s and the gas flow velocity in the preceding zone is about 0.9 m/s.

Depending on the desired result, the descending particles may be agglomerated in various degrees. In a certain aspect of the invention, the mean particle size of the discharged particles is at least doubled compared to the incoming descending particles. Also, the particle size distribution is in general modified by the present invention because the lightest particles in a certain zone are blown higher into the drying chamber. In the area above the fluid bed, the lighter particles may agglomerate when interacting with partly dried particles from the spray dryer. Thus, the particle size distribution is generally narrower compared to a process in which fluid bed back-mix agglomeration technology is used.

An advantage of the agglomeration method according to the invention is that a more safe process may be used and at the same time the other advantages mentioned may be achieved. Without having the fluid bed agglomeration by means of supplying an agglomeration fluid to the particles, prior art agglomeration in a spray dryer demanded that a product with a higher moist content descended into the fluid bed to secure the agglomeration. The particles with high moisture content are more prone to form lumps and the process is conducted closer to dryer limits. A traditional FSD™ spray dryer may e.g. have 3-5% moist in the fluidized particles, whereas, in a FSD-GRANULATOR™ according to the method of the invention, the same product may have 1-4% moist.

In a certain embodiment, the bulk density of the discharged particles is substantially the same as the bulk density of the incoming descending particles, i.e. the bulk density after agglomeration shows substantially the same value (measured in g/ml) as if no nozzles were used. Using prior art methods, the agglomerates are nearly always of a lower bulk density than the bulk density of the descending particles. Therefore, the present method is more versatile than the previous available methods.

The agglomeration fluid may have any suitable composition. E.g., the agglomeration fluid may be water or may have essentially the same dry matter composition as the incoming descending particles. Also, the agglomeration fluid may be a melt.

DETAILED DESCRIPTION OF THE INVENTION

Figure 1:
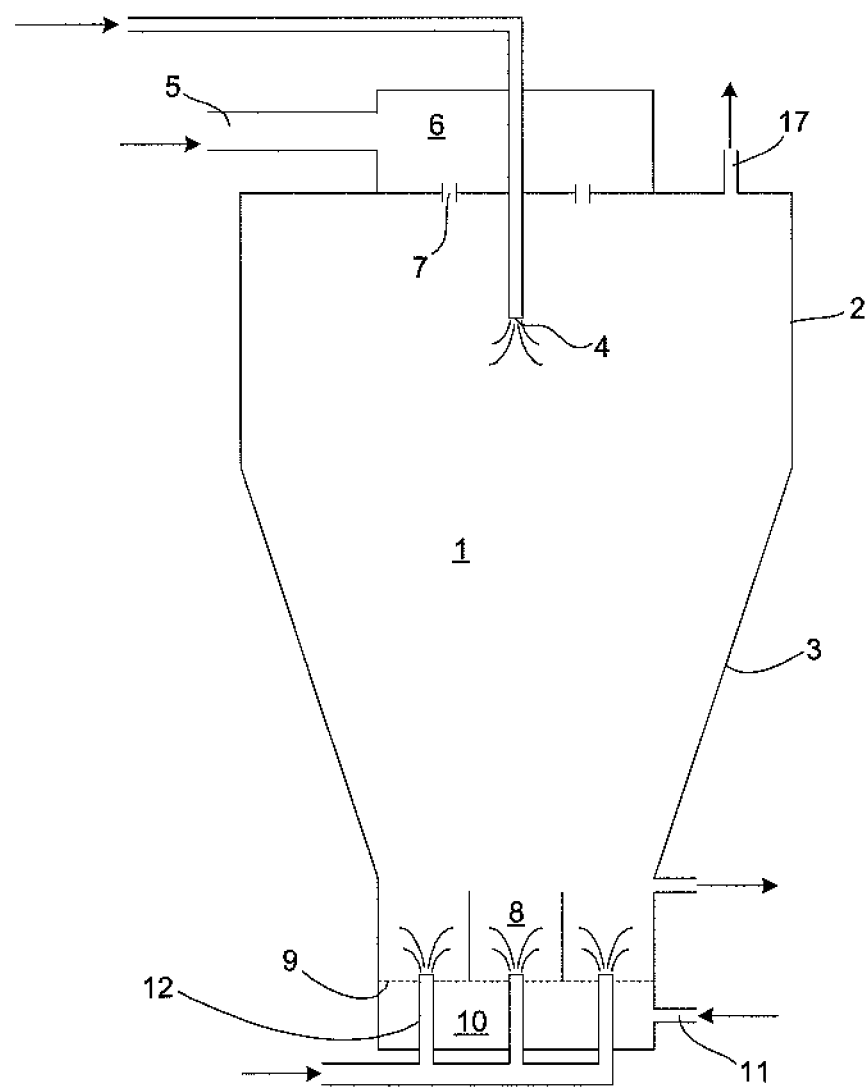
FIG. 1 discloses an agglomeration apparatus in which a fluid bed is positioned in the lower part of a spray drying chamber.

In FIG. 1 an embodiment of the invention is disclosed (the Niro FSD-GRANULATOR™). The architecture of the fluid bed is shown from different perspectives in FIG. 4 and FIG. 5.

A drying chamber 1 is provided having an upper cylindrical part 2 and a lower downward tapering frusto-conical part 3. In the upper part of the drying chamber an atomizer 4 is provided. The atomizer shown is a nozzle. Any suitable nozzle may be used, e.g. a two-fluid nozzle or a pressure nozzle, but alternatively rotary atomizers can be used as well. A fan or similar means introduce a drying gas, usually air, at 5. The gas is conveyed to an air disperser 6 and introduced in the drying chamber through an annular orifice 7 around the atomizer. The gas flow entering at 5 and the temperature of the drying gas supplied to the spraying chamber can normally be controlled for obtaining the desired drying capacity.

The particles ejected from the atomizer are partly dried by the drying gas to moist particles. The particles are carried in a downward windering direction. At the part of the drying chamber comprising the downward tapering frusto-conical wall, agglomeration is generally observed. At the bottom of the frusto-conical part of the drying chamber a fluid bed 8 is provided as an extension.

The fluid bed comprises a perforated plate 9 and a plenum 10. The perforations in the perforated plate may have any suitable shape adapted to the specific particles being treated and may direct the fluidisation gas in various directions. The shape of the perforations may be designed so as to avoid that particles can pass through these perforations or to improve the sanitary conditions in the fluid bed. The perforations may be designed to assist in the transport of the fluidised particles towards the outlet. Specific embodiments of the perforated plate are disclosed in U.S. Pat. No. 5,357,688 (Niro, FLEX PLATE™), U.S. Pat. No. 5,392,531 (Niro, NON-SIFTING GILL PLATE™), U.S. Pat. No. 5,839,207 (Niro, BUBBLE PLATE™), and U.S. Pat. No. 5,695,701 (Niro), the content of these patents being incorporated herein by reference. In an aspect of the invention, the perforations successively become larger toward the zone most proximal to the outlet to provide for an increasing fluidisation gas velocity.

The plenum 10 distributes the fluidisation gas to each zone. A fan (not shown) feeds the plenum with gas (air) at a fluidisation gas inlet 11. In the plenum, means may be provided to direct the fluidisation gas to specific sections. Such means include baffles and screens to provide for different fluidisation gas flow velocities in the sections. In the alternative, each section may be provided with separate plenums. Thus, each section may be connected to a separate fan or similar means that allow for a regulation of the gas flow to each section.

Nozzles 12 for atomizing an agglomeration fluid are provided in the fluid bed. The nozzles may be of any conventional type, including pressure nozzles or two-fluid nozzles. The nozzles are adjustable in heights to be adaptable to processing various agglomerates. Thus, in certain applications, it is advantageous to displace the nozzles above the level of the perforated plate to ensure that particles already having the desired particle size and therefore appearing in the lower part of the fluidised layer are not exposed to further agglomeration.

Figure 4:
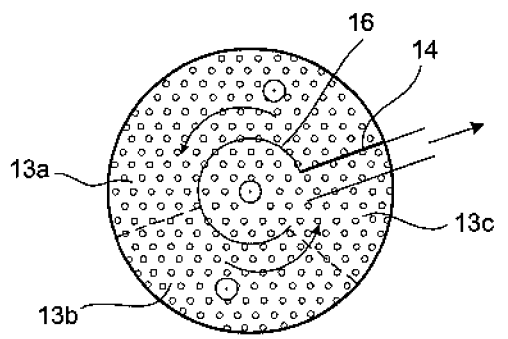
FIG. 4 depicts a view from above of the fluid bed in which a part of a cylindrical partition wall is co-axially provided in the fluid bed.
Figure 5:
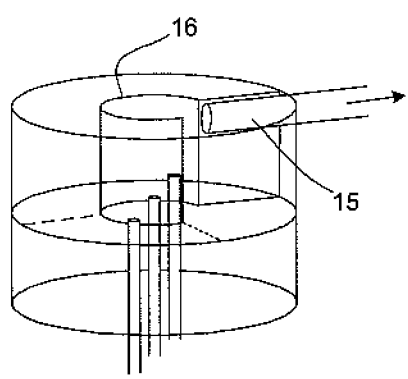
FIG. 5 shows a partly transparent view of the embodiment shown in FIG. 4.

The design of the fluid bed is disclosed in further detail in FIG. 4 and FIG. 5. FIG. 4 discloses a nozzle positioned in each section 13a, 13b, and 13c. The nozzles are generally dispersed in the fluid bed to avoid interference between each nozzle. Partition walls 14 and 16 are provided in the fluid bed. The partition walls abut the perforated plate 9 to avoid migration of heavier particles between the zones. On one face of the partition wall a radial outlet is provided. The flow path of the fluidised particles commences at the face of the partition wall 14 not facing the radial outlet. The particles are guided without substantial back-mixing in the space between the interior circumference of the fluid bed walls and a partly cylindrical partition wall. The particles descending to the fluid bed are treated with the atomized liquid ejected by the nozzle and subsequently dried by the fluidisation gas. During the drying of the particles they pass a phase in which they are sticky and have possibility of adhering to other particles, thereby forming an agglomerated particle. This treatment is repeated a certain number of times until a desired particle size is reached.

When particles are conveyed from one section to a subsequent section, e.g. from section 13a to section 13b, the particles are subjected to a higher fluidisation gas flow velocity. In consequence, the lighter particles will be ejected higher into the spray drying chamber and exposed to agglomeration with descending particles from the spray dryer. In this fashion, the proportion of fine particles is reduced. When the fluidised particles have reached the third section 13c, i.e. the inner zone, they are treated with an agglomeration fluid until they have attained the desired weight. The final product leaves the fluid bed through the radial outlet 15.

The product may be treated further in a subsequent step. In an aspect of the invention, the product is treated in a drying device for further drying the agglomerated particles. The drying device may be selected from a variety of devices ready at hand for the skilled person. As examples, the drying device can be a moving endless belt for free or forced evaporation of the residual moisture or a fluid bed. A fluid bed is generally preferred for better control of the final moisture content. A preferred fluid bed is the Niro VIBRO-FLUIDIZER®. It may also be desired to cool the particles after the post-drying step. Suitably, then, the fluid bed is separated in a drying compartment and a cooling compartment for simultaneous drying and cooling of the particle.

The spent drying gas from the spray drying process and the fluidisation gas from the fluid bed process, collectively referred to as the spent gases, leave the apparatus in the upper part of the spray drying chamber through conduit 17. The spent gasses may be treated to separate entrained particles from the gas in the spray drying chamber via integrated filters, or in filter units or cyclones external to the present apparatus. When an external fines separation device is used, the fines may be added to the drying chamber again. The addition of the fines may suitably take place near the atomizer in the top of the spray drying chamber or at the conical part of the spray drying chamber.

When the spent gases are treated in the spray drying chamber, internal filters may be used. Preferably, the filters are flexible bag filters made of a soft material, such as a polymeric mesh, weave or felt of natural or synthetic fibres or yarns. Preferred materials are polymers, e.g. polyesters or polypropylene. However, filter may also be non-flexible, such as metal filters, ceramic filters, polymer filters, etc.

The filter serves to retain the particles and withdraw the spent gases. Typically, the flexible filter is a filter bag arranged vertically in the drying chamber. The filter bag is closed at the bottom and connected at the top to means for withdrawing the spent gases. A series of filter bags may be arranged in a circular pattern inside the drying chamber in the upper cylindrical part to reduce space requirement. The means for withdrawing the spent drying gas through the filter element is suitably a fan, but can be any equipment capable of producing a pressure difference across the filter sufficient for removing the spent gas.

To prevent clogging, the filter bag may suitably be provided with a nozzle capable of producing short, moderate counter blows of pressurized gas to cause the fine particles settled on the flexible filter element to fall down into the lower part of the drying chamber. By suitable adjustment, the particles may be released from the flexible filter bags by a minor counter blow at low pressure, which does not spread the particles over a large area inside the drying chamber, but allows them to fall directly down into the agglomeration zone in the conical part of the spray drying chamber. Typically, the nozzle is activated intermediately every 3 minutes. Longer or shorter periods between each counter blow can be selected according to the need for preventing clogging. The nozzle is typically a reverse jet air nozzle, e.g. as disclosed in U.S. Pat. No. 6,332,902 (Niro), which is incorporated herein by reference.

Figure 2:
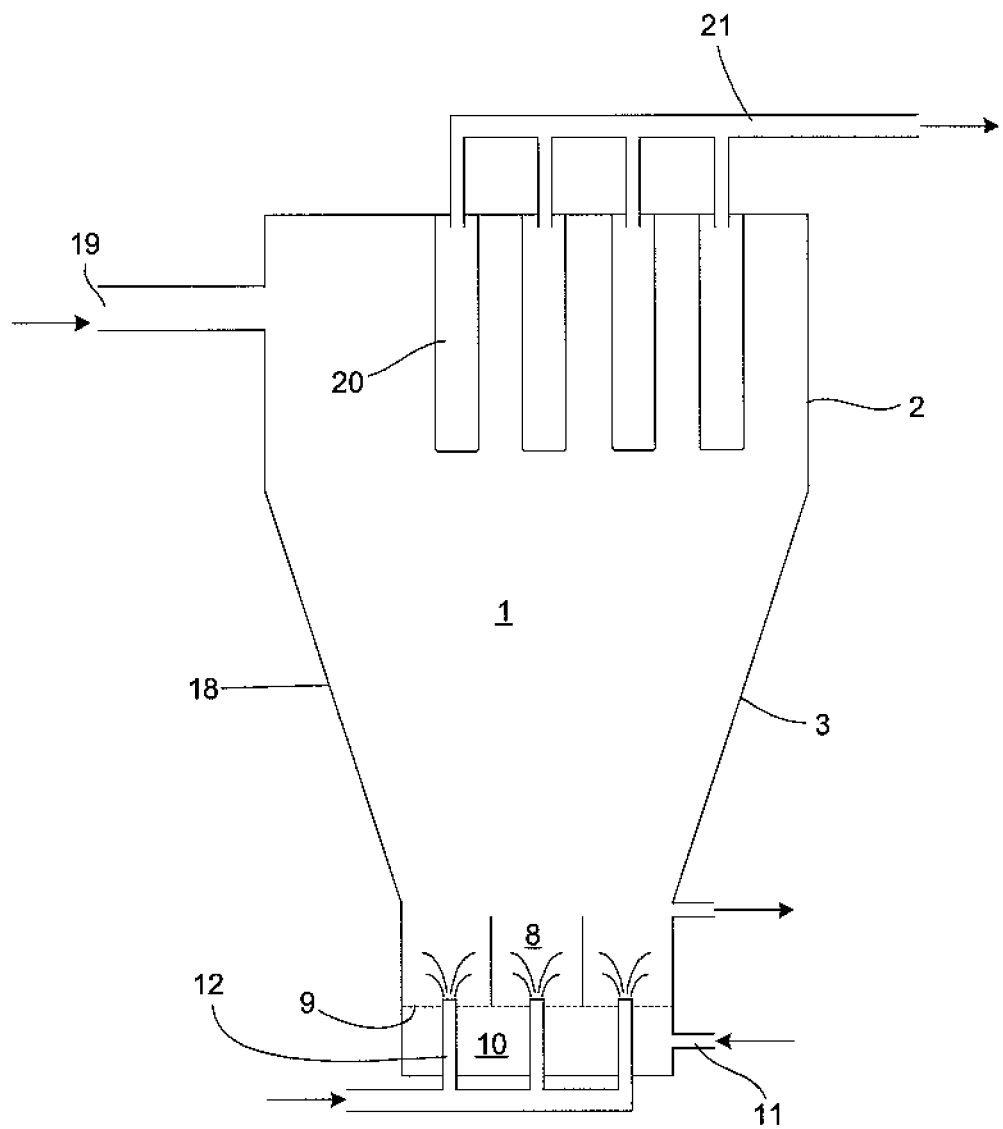
FIG. 2 shows an agglomeration apparatus in which a fluid bed is arranged in the bottom part of a filter unit.

FIG. 2 shows an embodiment of the invention in which the descending particles stem from a filter unit. A feedstock comprising particles entrained in a gas flow is entering a dust chamber 18 at inlet 19. The feedstock may arrive from e.g. an external drying device. As examples, the external drying device may be a spray dryer, a flash dryer or a fluid bed. The dust chamber comprises filter bags 20 arranged vertically in the ceiling of the chamber. The filter bags are connected to a fan (not shown) through a conduit 21 for removing the spent gas. To obtain liberation of particles from the filter bags they are usually provided with a nozzle capable of providing a counter blow in a similar fashion as described above for filter bags arranged internally in a spray drying chamber. In the bottom of the chamber 18 a fluid bed is provided. The fluid bed is disclosed in more detail in FIG. 4 and FIG. 5, and explained above.

Figure 3:
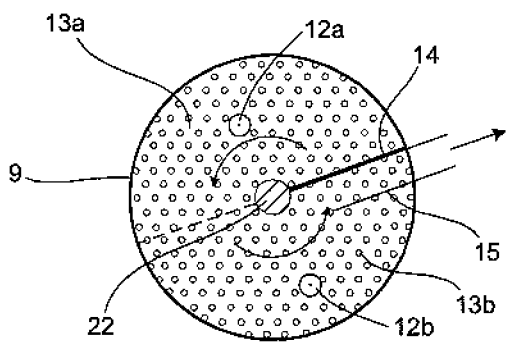
FIG. 3 depicts a view from above of the fluid bed in which two nozzles are provided, one nozzle in each of the two zones.

FIG. 3 shows a top view of an embodiment of the fluid bed. In a first zone 13a, a nozzle 12a for atomizing an agglomeration fluid is provided. A dashed line demarcates the borderline between the first and the second section 13b. The second section comprises a second nozzle 12b for atomizing an agglomeration fluid. In the centre of the fluid bed a void space 22 is provided and a partition wall connects the interior wall of the fluid bed with the void space. The particles are conveyed in the direction indicated by the arrows on the drawing, i.e. the path of the fluidised particles goes from section 13a to 13b while simultaneously being agglomerated and dried. In the area close to the nozzle the particles are wetted by the atomized agglomeration fluid and tend to agglomerate. When the particles are conveyed to the second zone 13b, the gas flow velocity increases and the minor particles are blown out of the fluidised layer higher up in the chamber, wherein agglomeration also takes place. In the second section the agglomerated particles leave through the outlet 15, extending from the inner zone close to the void space to the exterior of the fluid bed.

Figure 6:
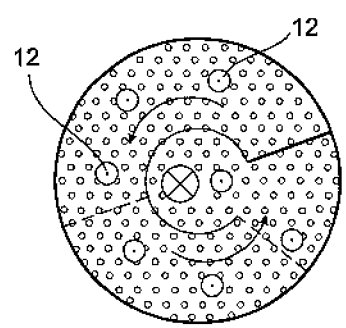
FIG. 6 shows a view from above of a fluid bed, in which the particles are discharged in the centre of the fluid bed.
Figure 7:
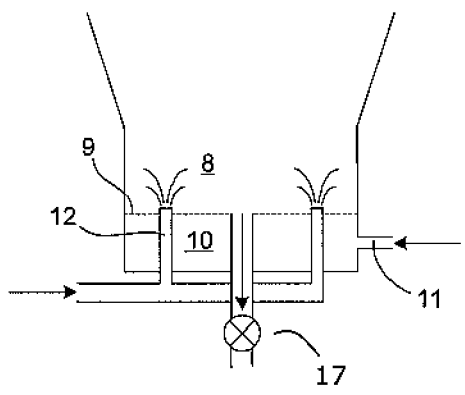
FIG. 7 discloses a partly transparent view of the embodiment shown in FIG. 6.

In FIG. 6 the outlet is provided in the centre or close to the centre of the fluid bed. FIG. 7 shows more details concerning this embodiment. A fluidised layer is maintained above the perforated plate 9 and guided through the three zones, 13a, 13b, and 13c. The fluidised particles are treated by atomized agglomeration fluid from three nozzles 12 in the first section, two nozzles in the middle section and two nozzles in the centre for obtaining an enhanced agglomeration. FIG. 7 shows only two nozzles for drawing technical reasons and the partition walls are omitted. When the agglomerated particles have reached the inner zone and have obtained a suitable size, they pass into the central outlet in the perforated plate and leave the apparatus. The conduit is provided with a rotating sluice 17 for adjusting the flow of agglomerated particles leaving the fluidised layer. The flow can be adjusted so as to regulate the fluidized volume.

Figure 8:
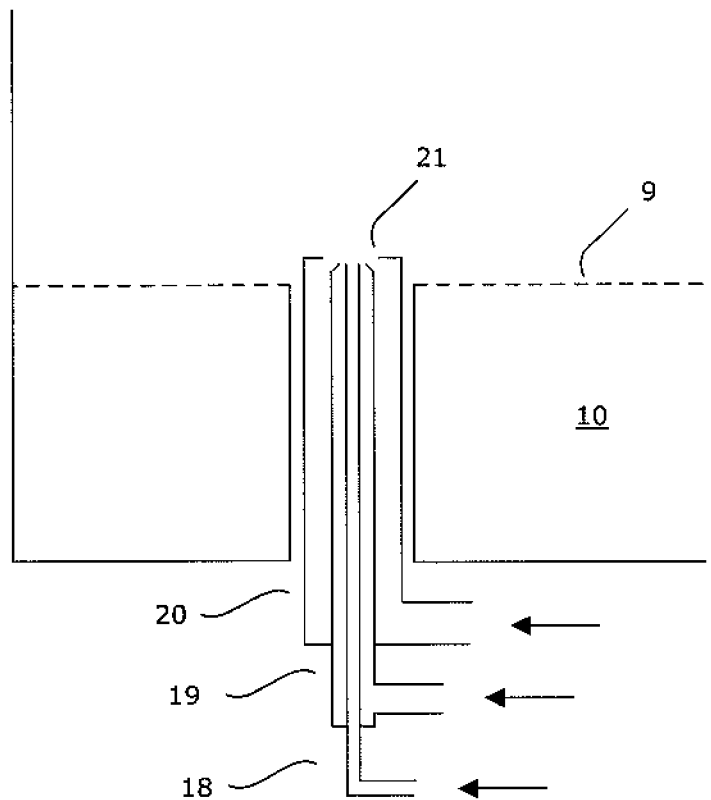
FIG. 8 discloses in the perforated plate a two-fluid nozzle provided with a supply of secondary fluidisation gas.

FIG. 8 shows a nozzle 12 protruding through the perforated plate 9. The nozzle comprises a central conduit 18 for agglomeration liquid. Co-axially around the conduit for agglomeration liquid, a tube 19 for nozzle gas is provided. The nozzle gas is supplied to the nozzle at a high pressure so as to atomize the agglomeration liquid at the tip. Around the tube 19 for supplying the nozzle gas a second tube 20 for supplying a secondary fluidisation gas is provided. The secondary fluidisation gas is liberated through an orifice 21, which may be adjustable to control the velocity of secondary fluidisation gas allowed to enter the fluid bed. Generally, the velocity of the secondary fluidisation gas is higher than the velocity of the primary fluidisation gas supplied through the perforated plate. The tube through which the secondary fluidisation gas is supplied may be provided with means for swirling the gas, such as a vane plate. The swirling secondary gas increases the interaction between the agglomerating particles in the fluid bed and the atomized agglomeration liquid.

EXAMPLE

The invention was tested on an agrochemical product in a Niro FSD™ spray dryer. The spray dryer including an integrated fluid bed was provided with an agglomeration nozzle in each of the two bed zones.

With the nozzles shut off, a product of mean particle size of 182 microns and a bulk density of 0.36 g/ml was achieved. With the agglomeration nozzles operating, spraying the same feed solution as in the top of the spray dryer, a product having a mean particle size of 495 microns and a bulk density of 0.36 g/ml was achieved. Thus, it was possible to obtain more than a doubling in mean particle size while being able to maintain the bulk density.

What is claimed is:

1. A method for producing agglomerated particles, comprising the steps of:
   maintaining in a fluid bed a fluidised particle layer above a plate having perforations through which fluidisation gas flows, said fluid bed being divided into an inner and an outer zone,
   supplying the fluidised particle layer with descending particles to be agglomerated in the fluid bed,
   atomizing an agglomeration liquid in the fluidised layer of particles,
   guiding the fluidised particles in a plug-flow toward an outlet,
   wherein the outer zone receives the majority of the descending particles and the inner zone is connected to an outlet, and
   providing the two zones with at least one atomisation nozzle in each zone.

* * * * *